US008719295B2

(12) United States Patent
Chang et al.

(10) Patent No.: US 8,719,295 B2
(45) Date of Patent: May 6, 2014

(54) MULTI-GRANULARITY HIERARCHICAL AGGREGATE SELECTION BASED ON UPDATE, STORAGE AND RESPONSE CONSTRAINTS

(75) Inventors: Yuan-Chi Chang, Armonk, NY (US); Lawrence Koved, Pleasantville, NY (US); Christian A. Lang, Santa Barbara, CA (US); Igor Sominsky, Hewlett, NY (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 13/169,514

(22) Filed: Jun. 27, 2011

(65) Prior Publication Data

US 2012/0330996 A1 Dec. 27, 2012

(51) Int. Cl.
*G06F 7/00* (2006.01)
*G06F 17/30* (2006.01)

(52) U.S. Cl.
USPC ......................................................... 707/769

(58) Field of Classification Search
USPC .................................. 707/705, 999.003, 769
See application file for complete search history.

(56) References Cited

U.S. PATENT DOCUMENTS

| | | | |
|---|---|---|---|
| 6,374,263 | B1 | 4/2002 | Bunger et al. |
| 6,438,537 | B1 * | 8/2002 | Netz et al. ............................... 1/1 |
| 7,007,006 | B2 | 2/2006 | Zilio et al. |
| 7,380,039 | B2 | 5/2008 | Miloushev et al. |
| 7,702,639 | B2 | 4/2010 | Stanley et al. |
| 7,788,365 | B1 | 8/2010 | Foster et al. |
| 2005/0262193 | A1 * | 11/2005 | Mamou et al. ................. 709/203 |
| 2007/0061211 | A1 * | 3/2007 | Ramer et al. ...................... 705/25 |
| 2008/0262991 | A1 | 10/2008 | Kapoor et al. |

FOREIGN PATENT DOCUMENTS

WO PCTUS2012032891 6/2012

OTHER PUBLICATIONS

K. Perumalla et al., "Efficient Parallel Execution of Event-Driven Electromagnetic Hybrid Models," International Journal for Multiscale Computational Engineering, Jul. 2007, pp. 27-38, vol. 5, No. 1.
N. Jain et al., "SMART: Adaptive Precision Setting for Aggregation Queries Over Distributed Data Streams," Department of Computer Sciences, Jan. 2009, 15 pages.
L. Golab et al., "Multi-Query Optimization of Sliding Window Aggregates by Schedule Synchronization," University of Waterloo, Technical Report CS-2006-26, Aug. 2006, 22 pages.

(Continued)

*Primary Examiner* — Aleksandr Kerzhner
(74) *Attorney, Agent, or Firm* — Anne V. Dougherty; Ryan, Mason & Lewis, LLP

(57) ABSTRACT

Techniques are disclosed for multi-granularity hierarchical aggregate selection based on update, storage and response constraints. For example, for a temporal hierarchy of aggregation statistics associated with a plurality of database records, wherein the temporal hierarchy comprises two or more aggregation statistics levels and each level has a different temporal granularity associated therewith, a method comprises iteratively modifying the temporal hierarchy to at least one of: (a) minimize a storage usage cost while satisfying a temporal hierarchy update constraint and a query response time constraint; (b) reduce a temporal hierarchy update time and a query response time while satisfying a storage usage constraint; and (c) minimize a query response time for frequently applied queries that do not shift in time while satisfying the storage usage constraint, wherein the resulting temporal hierarchy that achieves at least one of (a), (b) and (c) is identified as an optimal temporal hierarchy.

18 Claims, 8 Drawing Sheets

(56) References Cited

OTHER PUBLICATIONS

M. Wilkie et al., "What's New in SAS OLAP Cube Studio 4.2," SAS Global Forum, Paper 316-2008, Mar. 2008, 12 pages.

J. Han et al., "Stream Cube: An Architecture for Multi-Dimensional Analysis of Data Streams," Distributed and Parallel Databases, Sep. 2005, pp. 173-197, vol. 18, No. 2, The Netherlands.

M. Golfarelli et al., "Materialization of Fragmented Views in Multi-dimensional Databases," Data & Knowledge Engineering, Jun. 2004, pp. 325-351, vol. 49, No. 3.

M. Lee et al., "Speeding Up Materialized View Selection in Data Warehouses Using a Randomized Algorithm," International Journal of Cooperative Information Systems, 2001, pp. 327-3563, vol. 10, No. 3.

"Performance Tuning for Queries with Aggregates ASAP for BW Accelerator," ASAP, Business Information Warehouse, Documentation on Using Aggregates in SAP BW, Document Version 1.0, Jun. 2000, 28 pages.

\* cited by examiner

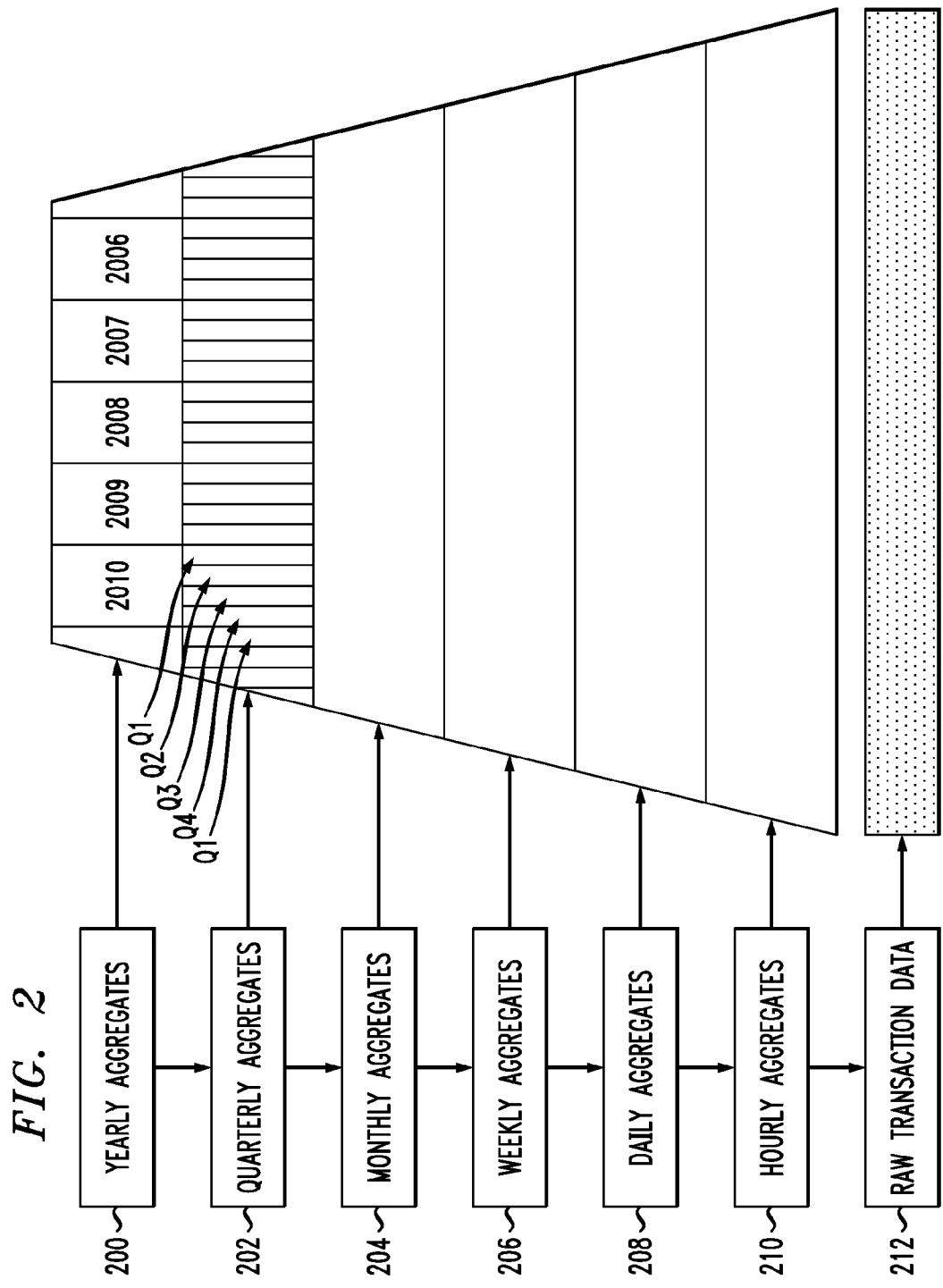

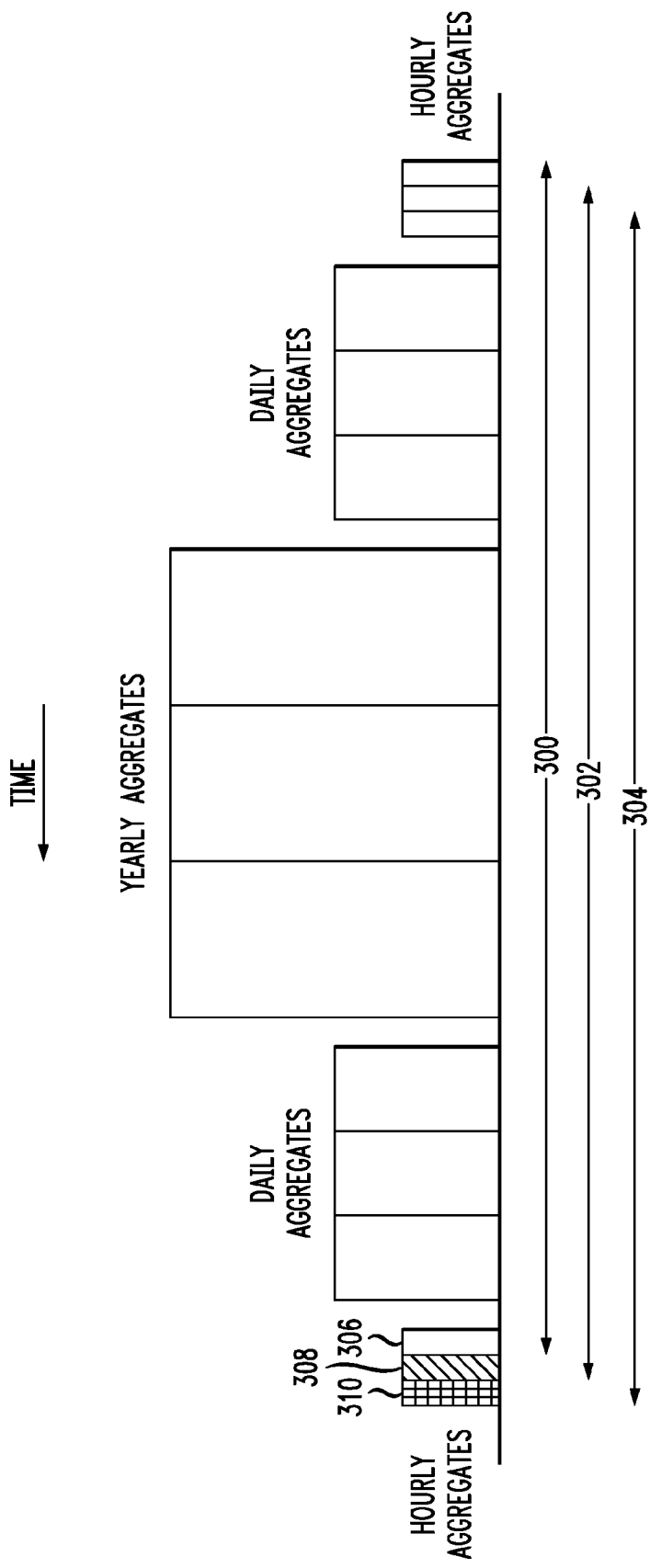

MULTI-GRANULARITY HIERARCHICAL AGGREGATE SELECTION BASED ON UPDATE, STORAGE AND RESPONSE CONSTRAINTS

FIELD OF THE INVENTION

The present invention relates generally to data processing systems and, more particularly, to improved relational data aggregate selection techniques over the time dimension in such data processing systems.

BACKGROUND OF THE INVENTION

In the application of electronic payment transaction fraud detection, it is often requested by fraud detection software to count transaction volume or sum the total dollar amount over multiple time periods. The intent is to establish statistics of payment history of a payment receiver, a payment originator or a pair of originator and receiver in order to gauge the likelihood of the current payment transaction being fraudulent. For example, a sudden surge of high volume, small dollar amount payment transactions between a pair with no recent history indicates either a behavior change of payment originator or a hijacked account by a third party. The transactions in question should then be flagged for investigation.

Common fraud detection software relies on a relational database management system to store and manage the payment transaction records. Depending on the type of electronic payment, transaction records can be inserted into the database at any time individually or at fixed time intervals in batches. The fraud detection software then issues queries in Structured Query Language (SQL) to the underlying relational database to collect aggregated statistics about parties involved in the transaction.

The aggregated statistics queries must be answered quickly so that the fraud detection software can make a decision in a split second. In the presence of hundreds of millions of transactions in the database, query response times in sub-seconds can only be achieved through pre-computed results, also known as materialized tables. These materialized tables store aggregated values such as summation and counts of the raw database transaction records based on pre-defined queries issued by the fraud detection software. The efficiency and accuracy of the system depend on the selection of such materialized aggregate tables.

SUMMARY OF THE INVENTION

Principles of the invention provide techniques for multi-granularity hierarchical aggregate selection based on update, storage and response constraints.

For example, in one aspect of the invention, for a temporal hierarchy of aggregation statistics associated with a plurality of database records, wherein the temporal hierarchy comprises two or more aggregation statistics levels and each level has a different temporal granularity associated therewith, a method comprises iteratively modifying the temporal hierarchy to at least one of: (a) minimize a storage usage cost while satisfying a temporal hierarchy update constraint and a query response time constraint; (b) reduce a temporal hierarchy update time and a query response time while satisfying a storage usage constraint; and (c) minimize a query response time for frequently applied queries that do not shift in time while satisfying the storage usage constraint, wherein the resulting temporal hierarchy that achieves at least one of (a), (b) and (c) is identified as an optimal temporal hierarchy.

Advantageously, illustrative principles of the invention provide an aggregate selection technique that creates a number of materialized relational tables in multiple time granularities to accelerate relational database queries in the face of frequently inserted data. These materialized relational tables store aggregated values such as summation and counts of the raw database transaction records over a specified period of time. The aggregated values often represent basic statistics of the data that need to be kept fresh as new transaction records are continuously inserted.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 illustrates a hierarchical relationship of temporal aggregates as a pyramid with finer grained aggregates at the bottom and coarse grained aggregates at the top, according to an embodiment of the invention.

FIG. 3 illustrates a sliding window query over time as new data records are inserted, according to an embodiment of the invention.

DETAILED DESCRIPTION

Illustrative embodiments of the invention will be described herein in the context of one or more illustrative data processing systems. However, it is to be understood that principles of the invention are not limited to any particular data processing system and may be implemented in systems other than the illustrative ones described herein.

A key problem addressed by illustrative principles of the invention is the problem of selecting materialized tables in a database subject to constraints on query response time, update cost, and storage usage. More specifically, the query workload is of the nature to aggregate transactions over specified sliding windows. For example, a workload may comprise queries to compute transaction volumes for a given payment originator over periods of the past day, week, month, six months, one year, and five years. It may also comprise queries to compute average dollar amount of transactions between a pair of payment originator and receiver over periods of the past day, week, month, and one year.

The materialized table selection problem is further complicated with periods of new transactions inserted into the database, thereby requiring the database management system to maintain the pre-computed results stored in the tables. More materialized tables improve query response time. However, they also increase update cost and storage space. In accordance with illustrative principles of the invention, we propose algorithmic ways of selectively materializing granules of aggregated values in the temporal hierarchy.

Illustrative principles of the invention described herein provide a computer-implemented method, a data processing system, and a computer program product for selecting materialized tables in a relational database to accelerate temporal aggregation queries in the face of frequently inserted records. The inventive techniques search for granules in the temporal hierarchy to pre-compute aggregated values subject to constraints in query response time, update cost, and storage usage. More specifically, sliding window queries, which shift query predicates temporally, are satisfied with multiple granularities at selected levels in the temporal hierarchy. Depending on the optimization objective, being response time or storage space, levels in the hierarchy are added or subtracted in iterations of cost estimation to meet respective constraints. The result is an optimized set of materialized tables to accelerate queries.

Figure 1A:
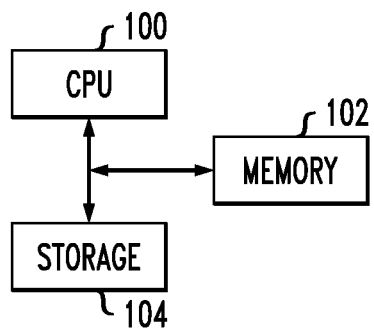
FIG. 1A illustrates a block diagram of a data processing system in which one or more illustrative embodiments of the invention are implemented.

With reference now to the figures and in particular with reference to FIG. 1A, a block diagram of a data processing system is shown in which one or more illustrative embodiments of the invention may be implemented. The system includes one or more central processing units (CPU) 100, main memory 102 and storage devices 104. Computer-executable code or instructions implementing the processes of the illustrative embodiments are executed by the CPU 100 and located temporarily in the main memory 102. The storage devices 104 are used to store the instructions as well as database records (e.g., formatted text documents) to be processed by the system.

Figure 1B:
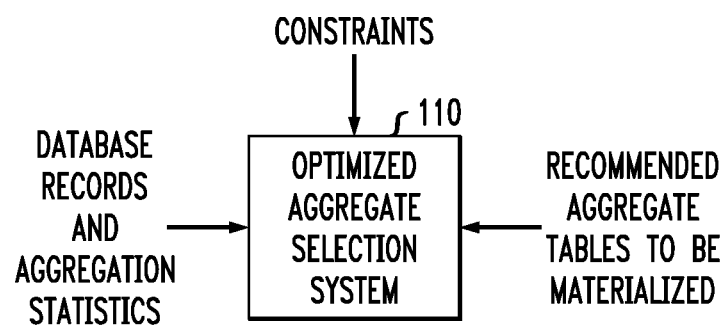
FIG. 1B illustrates a block diagram of an optimized aggregate selection system, according to an embodiment of the invention.

FIG. 1B illustrates a block diagram of an optimized aggregate selection system, according to an embodiment of the invention. As shown, system 110 takes as input database records, aggregation statistics and given constraints, and outputs recommended aggregate tables to be materialized. As will be explained in detail below, one or more of the methodologies that are described below in the context of FIGS. 6-8 may be executed by system 110 to yield the output results. It is also to be appreciated that system 110 may implement the data processing system architecture of FIG. 1A in order to execute the one or more methodologies.

Turning now to FIG. 2, the diagram depicts a hierarchical relationship of temporal aggregates as a pyramid with the finer grained aggregates at the bottom and the coarse grained aggregates at the top. At the highest level stand the pre-computed aggregates on a yearly basis 200. For example, a materialized table at this level may store the total volume of transactions by payment originator in the years 2010, 2009, 2008, 2007, and 2006, where each year is considered a granule. A query to compute the total volume of transactions in the past three years from Jan. 1, 2010 can be answered simply by adding the three pre-computed results from 2010, 2009, and 2008.

The next level down in the time hierarchy stores aggregates pre-computed on a quarterly basis 202. A query to compute total transaction volume in the past three years from Apr. 1, 2011 can be answered by adding results from Q1 of 2011, 2010, 2009 plus Q4, Q3 and Q2 of 2008. Thus, quarters are the granules at this level.

Similarly, monthly 204, weekly 206, daily 208, and hourly 210 aggregates can be pre-computed and stored in materialized tables (with months, weeks, days and hours being the granules, respectively). At the bottom of the hierarchy are the raw transaction data records 212, from which all the aggregates can be computed at the expense of long query response time. We can safely assume these records always exist although preferably none or a tiny fraction is accessed to answer a query.

It is to be appreciated that for a known query workload, not every granule at each level needs to be pre-computed and stored. Monthly aggregates may be derived from weekly or daily aggregates at the expense of query response time. Therefore, it is important to understand the nature of typical queries in the context of the illustrative description of the invention given herein.

FIG. 3 depicts a sliding window query over time as new data records are inserted. On an hourly basis, new batches of transactions are inserted as shown through 306, 308 and 310. The time spans associated with 300, 302, and 304 suggest queries also shift the predicate on time, often through SQL predicate on CURRENT TIMESTAMP minus a fixed period, e.g., one year, one week or one day. As time progresses from right to left in this figure, query 300 includes transactions in 306. Query 302 includes transactions in 306 and 308. Query 304 includes transactions in 306, 308 and 310. As the sliding window queries progressively include newly inserted data, they also progressively exclude some hourly aggregates at the beginning of the window (i.e., see the right side of FIG. 3).

It is clear from this example that the nature of sliding window queries leads to granules at the lower levels of the time hierarchy (hourly, daily) being materialized at the beginning and ending parts of a query window, while granules at the higher levels of the time hierarchy (yearly) are materialized at the middle part of a query window.

Figure 4:
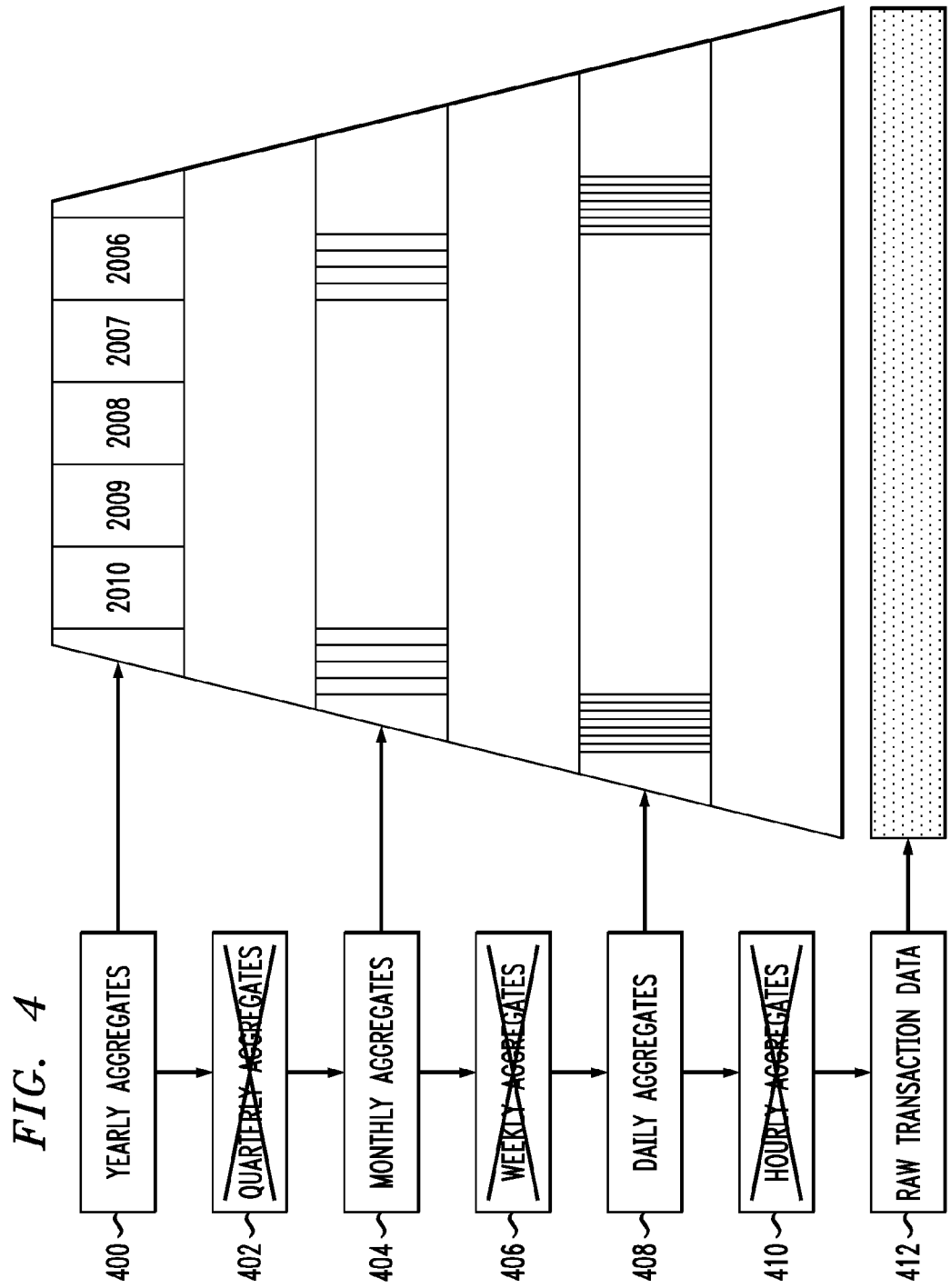
FIG. 4 illustrates a scenario where aggregates are pre-computed at yearly, monthly and daily intervals, according to an embodiment of the invention.
Figure 5:
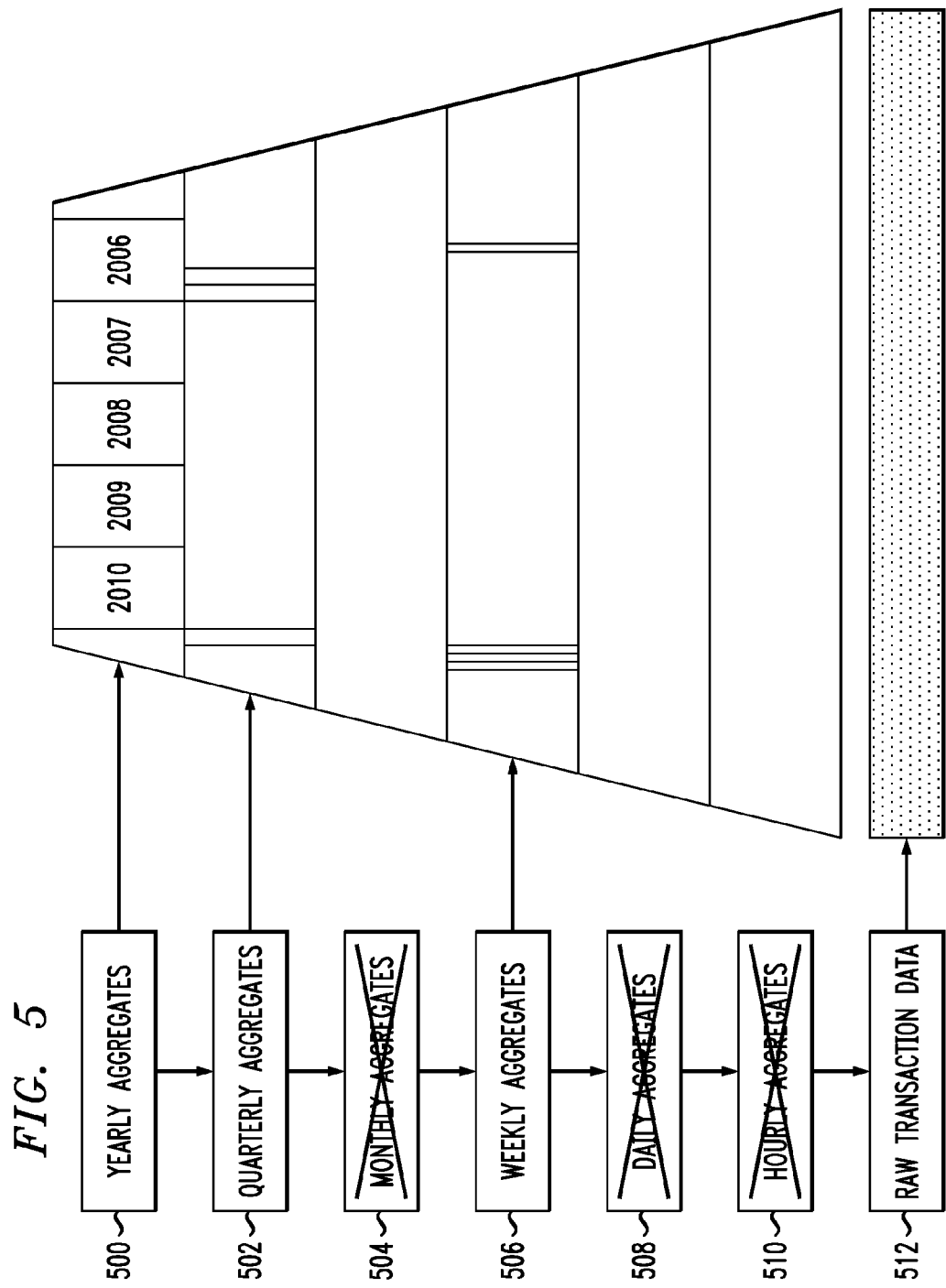
FIG. 5 illustrates a scenario where aggregates are pre-computed at yearly, quarterly and weekly intervals, according to an embodiment of the invention.

It is realized that specific query workload, update cost and storage usage decide selected levels of materialization. FIG. 4 illustrates a scenario where aggregates are pre-computed at yearly, monthly and daily intervals. FIG. 5 illustrates a scenario where aggregates are pre-computed at yearly, quarterly and weekly intervals. Note that the reference numerals in FIG. 4 correspond to those used in FIG. 2 but are simply incremented by 200, while the reference numerals in FIG. 5 correspond to those used in FIG. 2 but are simply incremented by 300.

Thus, to answer a sliding window query over the past five years, the scheme in FIG. 4 needs to store four yearly aggregates plus 12 monthly aggregates plus 30 daily aggregates. The scheme in FIG. 5 needs to store four yearly aggregates plus four quarterly aggregates plus four weekly aggregates. At first glance, the FIG. 5 scheme has the advantage of fewer aggregates and lower storage usage. However, its update cost will take longer since more raw transaction data has to be accessed to refresh the weekly aggregate of the current week. In contrast, the FIG. 4 scheme can update the daily aggregate of the current day by accessing $1/7^{th}$ of the raw transaction data that needs to be accessed in the scheme of FIG. 5.

Real-world query workload issued by fraud detection software rarely has only one fixed period as illustrated in the scenarios in FIG. 4 and FIG. 5. Instead, a workload typically contains a mixture of queries possibly over periods of the past day, week, month, six months, one year, or five years. Optimal materialization selection cannot be searched manually. Illustrative principles of the invention provide three algorithmic solutions to selectively materialize multiple granularities in the time hierarchy, subject to optimization objectives and associated constraints. These three solutions are described below in detail in the context of FIGS. 6, 7 and 8, respectively.

Figure 6:
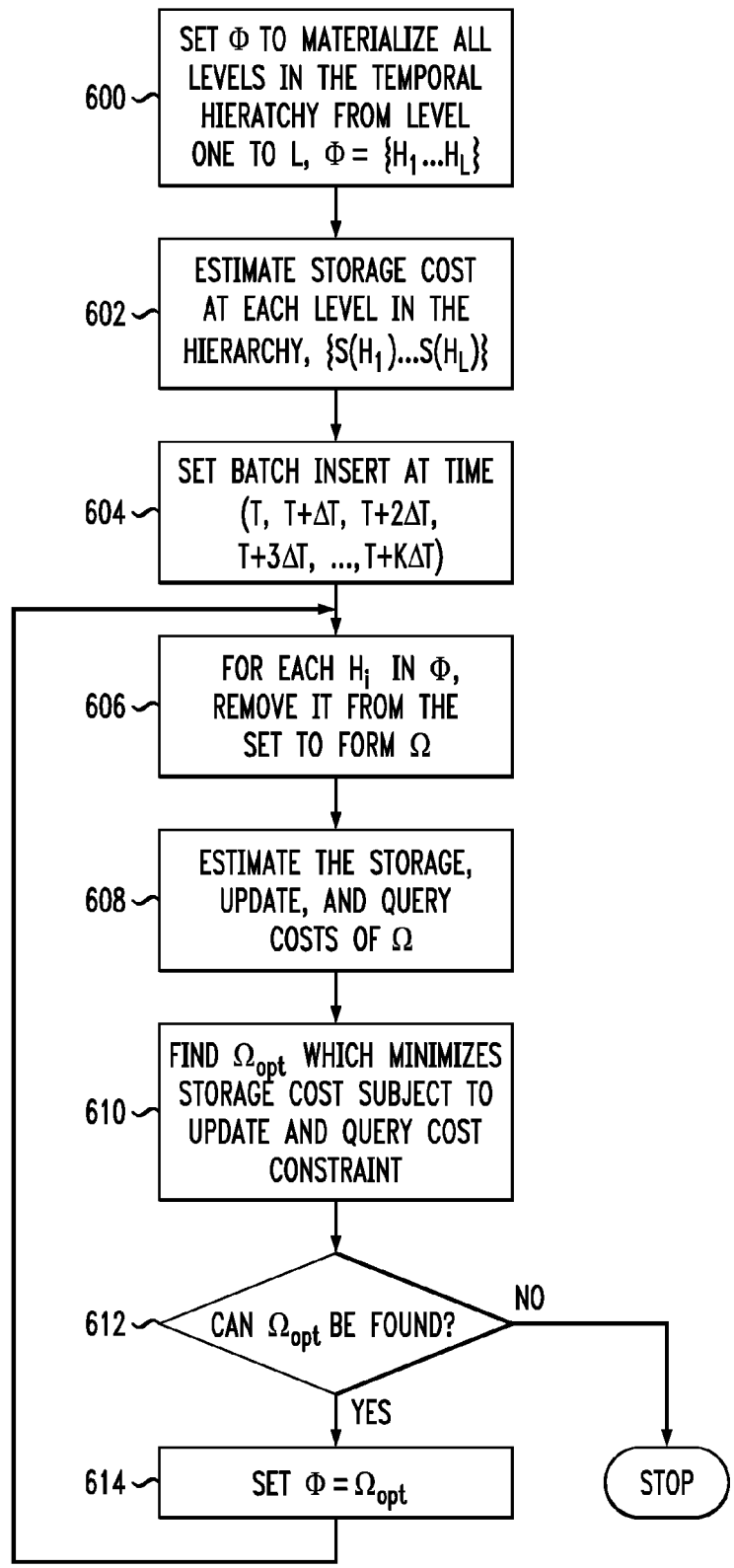
FIG. 6 is a flow diagram of steps to selectively materialize some levels in the time hierarchy to minimize extra storage space, according to an embodiment of the invention.

FIG. 6 shows a flow diagram of steps to selectively materialize some levels in the time hierarchy to minimize storage space, subject to constraints on query response time and update cost. In practical situations, this translates, e.g., to processing ten million transactions in a batch window of ten minutes. The algorithm starts by assuming all the levels in the time hierarchy to be materialized (step 600). It then estimates the storage usage (cost) at each level (step 602). For example, materializing daily aggregates takes seven times more space than materializing weekly aggregates. Step 604 sets an insert workload for the next K windows. For example, the database administrator may choose to optimize for an insert workload for five business days with eight batch inserts for each day. The insert workload is then characterized as 5×8=40 batch inserts.

Steps 606 through 614 iteratively remove temporal levels to reduce storage space occupied by materialized tables without violating query and update constraints. For each level, step 606 removes the level and step 608 estimates costs of the remaining materialization levels. For example, if the monthly level is removed, its upper level quarterly aggregates can be computed using its lower level weekly aggregates. The number of queries in the workload that requires such runtime computation determines if the storage saving outweighs longer query response time.

Step 610 finds the level with the most aggressive storage space reduction without violating query and update constraints. If a solution is found (step 612), the next iteration begins (step 614) to remove another temporal level. If no solution can be found, the algorithm stops and recommends the current set of temporal levels to be materialized.

Figure 7:
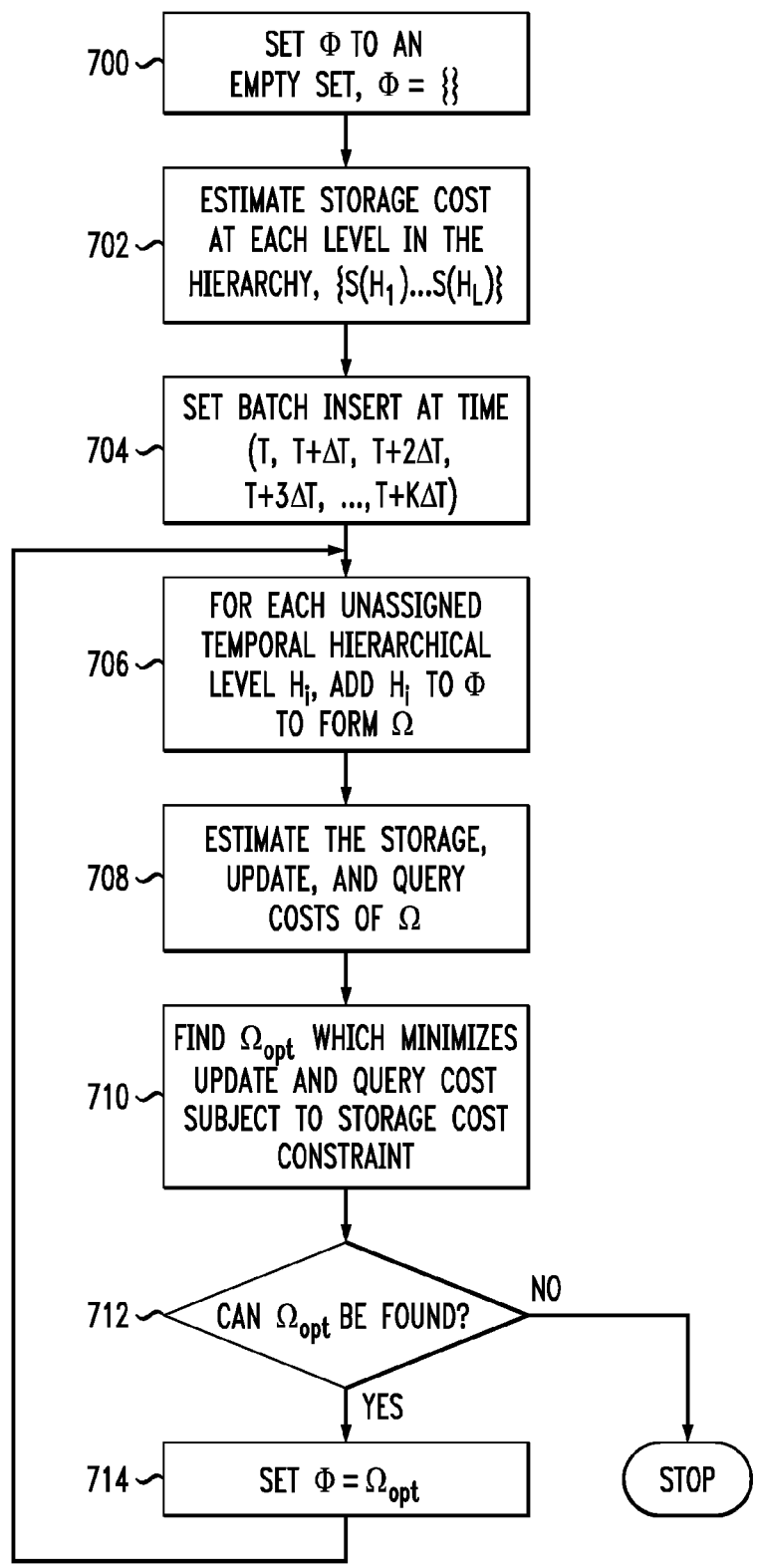
FIG. 7 is a flow diagram of steps to selectively materialize some levels in the time hierarchy to minimize update and query cost, according to an embodiment of the invention.

FIG. 7 shows a flow diagram of steps to selectively materialize some levels in the time hierarchy to minimize update and query cost. The solution mirrors the algorithm described in FIG. 6. This algorithm in FIG. 7 seeks to minimize query response time and update cost subject to storage space constraint.

The algorithm starts by assuming none of the levels in the time hierarchy is materialized (step 700). It then estimates the storage usage (cost) at each level (step 702). The insert workload is then given at step 704.

Steps 706 through 714 iteratively add temporal levels to increase storage space occupied by materialized tables to decrease query and update costs. For each level, step 706 first adds a level to the set of levels already chosen. The algorithm estimates the added storage space and the benefit of materializing the level chosen (step 708).

Step 710 finds the level with the most reduction in query and update cost without violating storage space constraints. If a solution is found (step 712), the next iteration begins (step 714) to add another temporal level. If no solution can be found, the algorithm stops and recommends the current set of temporal levels to be materialized.

It is to be appreciated that the algorithms described in the context of FIGS. 6 and 7 are more applicable to sliding window queries such as are depicted in FIG. 3. However, it is to be further appreciated that some statistics requested by fraud detection software may not fall in the category of sliding window queries. For example, fraud detection statistics may query aggregated values for the same month last year. In such case, the search of optimal time granules needs to be generalized to all possible temporal nodes. By nodes, we mean the atomic unit represented in the time hierarchy. For example, the yearly aggregate 2010 is a node, so is the monthly aggregate March 2011, etc.

Figure 8:
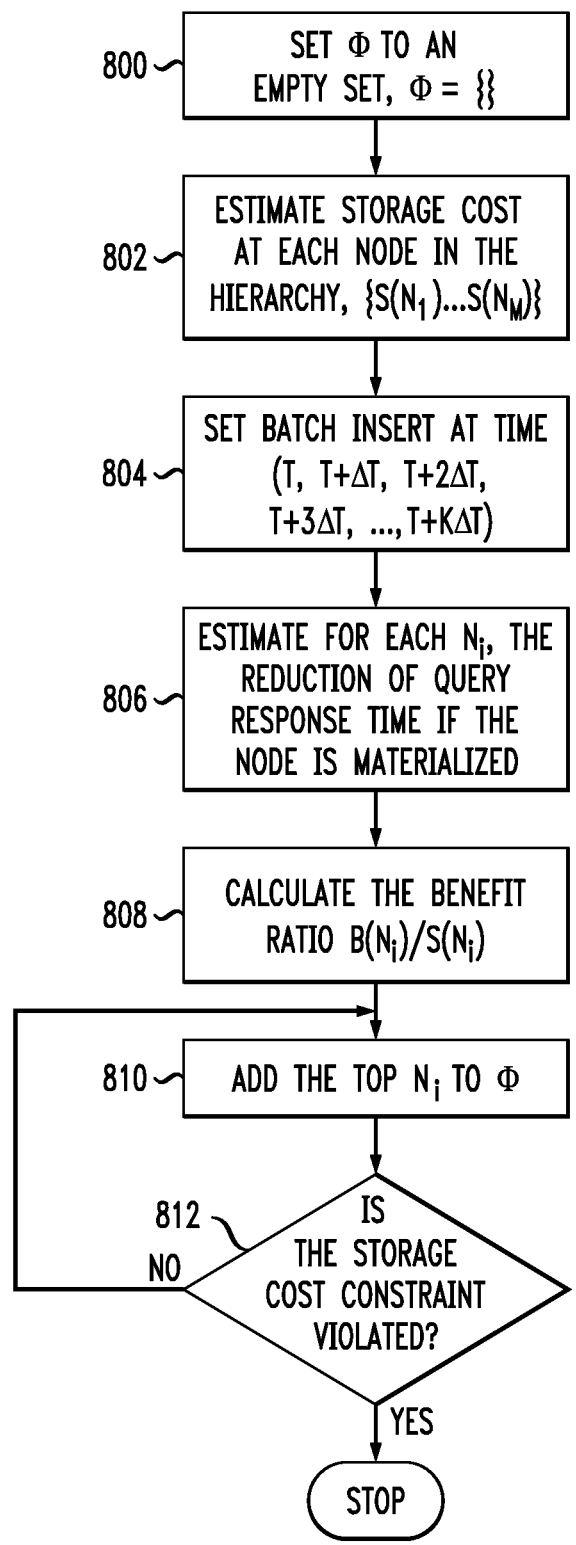
FIG. 8 is a flow diagram of steps to selectively materialize some granules across the time hierarchy to minimize query response time, according to an embodiment of the invention.

FIG. 8 shows a flow diagram of steps to selectively materialize some granules across the time hierarchy to minimize query response time. The optimal answer has computational complexity equivalent to Knapsack optimization, a known NP problem. We thus apply a greedy heuristic to search for a suitable answer.

The algorithm starts by assuming none of the nodes is materialized (step 800). It then estimates the storage usage (cost) at each node (step 802). The insert workload is then given at step 804.

Steps 806 through 812 iteratively add nodes to increase storage space occupied by materialized tables while decreasing query and update costs at the same time (step 806). This greedy heuristic looks for the node with the best cost-benefit ratio (step 808). The top nodes are then added to the set (step 810). The heuristic stops if the storage cost constraint is violated (step 812). Else, it continues to add more nodes to materialize in relational tables.

It is to be appreciated that while FIGS. 6, 7 and 8 illustrate methodologies that may be executed separately and independently by an optimized aggregate selection system (110 in FIG. 1B), it is to be understood that the system could advantageously execute two or more of the methodologies in combination. In this manner, multi-granularity hierarchical aggregate selection based on update, storage and response constraints may be achieved.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1A through 8, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1A-8, can also include, as described herein, providing a system, wherein the system includes distinct modules (e.g., modules comprising software, hardware or software and hardware). By way of example only, the modules may include but are not limited to an optimized aggregate selection module. This and other modules may be configured, for example, to perform the steps described and illustrated in the context of FIGS. 1A-8.

One or more embodiments can make use of software running on a general purpose computer or workstation comprising a processor, a memory, and an input/output interface formed, for example, by a display and a keyboard. The term "processor" as used herein is intended to include (but not be limited to) any processing device, such as, for example, one that includes a CPU (central processing unit) and/or other forms of processing circuitry. Further, the term "processor" may refer to more than one individual processor. The term "memory" is intended to include (but not be limited to) memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include (but not be limited to) one or more mechanisms for inputting data to the processing unit (for example, keyboard or mouse), and one or more mechanisms for providing results associated with the processing unit (for example, display or printer).

The processor, memory, and input/output interface such as display and keyboard can be interconnected, for example, via bus as part of a data processing unit (e.g., FIG. 1A). Suitable interconnections, for example, via bus, can also be provided to a network interface, such as a network card, which can be provided to interface with a computer network, and to a media interface, such as a diskette or CD-ROM drive, which can be provided to interface with media.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard, display, pointing device, and the like) can be coupled to the system either directly (such as via bus) or through intervening I/O controllers (omitted for clarity).

Network adapters such as network interface may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, the system as shown in FIG. 1A) running a server program. It will be understood that such a physical server may or may not include a display and keyboard. Also, such a computer architecture could represent an illustrative implementation of a client.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:

for a temporal hierarchy of aggregation statistics associated with a plurality of database records, wherein the temporal hierarchy comprises two or more aggregation statistics levels and each level has a different temporal granularity associated therewith, iteratively modifying the temporal hierarchy to at least one of: (a) minimize a storage usage cost while satisfying a temporal hierarchy update constraint and a query response time constraint by removing one or more levels of the temporal hierarchy; (b) reduce a temporal hierarchy update time and a query response time while satisfying a storage usage constraint by adding one or more levels to the temporal hierarchy; and (c) minimize a query response time for frequently applied queries that do not shift in time while satisfying the storage usage constraint by adding one or more nodes to the temporal hierarchy, wherein the resulting temporal hierarchy that achieves at least one of (a), (b) and (c) is identified as an optimal temporal hierarchy;

wherein the temporal hierarchy is stored in a memory and the iterative modifying of the temporal hierarchy is performed by a processor device.

2. The method of claim 1, wherein the one or more levels of the temporal hierarchy are removed so as to minimize the storage usage cost subject to the query response time constraint and the temporal hierarchy update constraint.

3. The method of claim 1, wherein the one or more levels of the temporal hierarchy are added so as to minimize the query response time and the temporal hierarchy update subject to the storage usage constraint.

4. The method of claim 1, wherein the one or more nodes of the temporal hierarchy are added so as not to violate the storage usage constraint.

5. The method of claim 1, wherein the optimal temporal hierarchy is used to materialize pre-computed results that are used to accelerate a response time to a query workload in the presence of newly inserted database records.

6. The method of claim 5, wherein the newly inserted database records are inserted at any time individually or at fixed time intervals in batches.

7. The method of claim 5, wherein the query workload requests aggregation statistics over a specified sliding window.

8. The method of claim 1, wherein the different temporal granularities comprise one or more of years, months, weeks, days, and hours.

9. The method of claim 1, wherein the database records correspond to payment history records.

10. The method of claim 9, wherein the aggregation statistics correspond to payment history of a payment receiver, a payment originator or a pair of originator and receiver in order to determine a likelihood of a current payment transaction being fraudulent.

11. The method of claim 10, wherein the aggregation statistics correspond to transaction volume and transaction dollar amounts.

12. An apparatus, comprising:

a memory for storing a temporal hierarchy of aggregation statistics associated with a plurality of database records, wherein the temporal hierarchy comprises two or more aggregation statistics levels and each level has a different temporal granularity associated therewith; and a processor device operatively coupled to the memory and configured to iteratively modify the temporal hierarchy to at least one of: (a) minimize a storage usage cost while satisfying a temporal hierarchy update constraint and a query response time constraint by removing one or more levels of the temporal hierarchy; (b) reduce a temporal hierarchy update time and a query response time while satisfying a storage usage constraint by adding one or more levels to the temporal hierarchy; and (c) minimize a query response time for frequently applied queries that do not shift in time while satisfying the storage usage constraint by adding one or more nodes to the temporal hierarchy, wherein the resulting temporal hierarchy that achieves at least one of (a), (b) and (c) is identified as an optimal temporal hierarchy.

13. The apparatus of claim 12, wherein the optimal temporal hierarchy is used to materialize pre-computed results that are used to accelerate a response time to a query workload in the presence of newly inserted database records.

14. The apparatus of claim 13, wherein the newly inserted database records are inserted at any time individually or at fixed time intervals in batches.

15. The apparatus of claim 13, wherein the query workload requests aggregation statistics over a specified sliding window.

16. The apparatus of claim 12, wherein the different temporal granularities comprise one or more of years, months, weeks, days, and hours.

17. The apparatus of claim 12, wherein the database records correspond to payment history records.

18. An article of manufacture, comprising a non-transitory computer readable storage medium having tangibly embodied thereon computer readable program code which, when executed, causes a processor device to, for a temporal hierarchy of aggregation statistics associated with a plurality of database records, wherein the temporal hierarchy comprises two or more aggregation statistics levels and each level has a different temporal granularity associated therewith, iteratively modify the temporal hierarchy to at least one of: (a) minimize a storage usage cost while satisfying a temporal hierarchy update constraint and a query response time constraint by removing one or more levels of the temporal hierarchy; (b) reduce a temporal hierarchy update time and a query response time while satisfying a storage usage constraint by adding one or more levels to the temporal hierarchy; and (c) minimize a query response time for frequently applied queries that do not shift in time while satisfying the storage usage constraint by adding one or more nodes to the temporal hierarchy, wherein the resulting temporal hierarchy that achieves at least one of (a), (b) and (c) is identified as an optimal temporal hierarchy.

* * * * *